United States Patent

[11] 3,572,622

[72] Inventor Harold H. Smith
 502 Vine St., Archbold, Ohio 43502
[21] Appl. No. 858,697
[22] Filed Sept. 17, 1969
[45] Patented Mar. 30, 1971

[54] TRESTLE FOR FLEXIBLE HOSE
 6 Claims, 5 Drawing Figs.
[52] U.S. Cl. .................................................. 248/49,
 182/181, 248/83, 248/165
[51] Int. Cl. .................................................. F16l 3/02
[50] Field of Search........................................... 248/49,
 166, 81, 82, 80, 167, 83, 172, 84, 89, 163, 165;
 182/185, 183, 186, 181

[56] References Cited
 UNITED STATES PATENTS
 619,647 2/1899 Wetherby..................... 248/49X
 2,550,793 5/1951 Ferriera........................ 248/163
 2,846,168 8/1958 Schroeter...................... 248/49

2,881,804 4/1959 Bub et al....................... 248/83X
 3,021,102 2/1962 Kuempel....................... 248/49

Primary Examiner—Chancellor E. Harris
Attorney—Owen and Owen

ABSTRACT: A trestle for a flexible hose such as a waste hose for a house trailer or camper. The trestle has a plurality of support units, each having a ground engaging base and two spaced, vertical arms between which the hose is positioned. Each support has a cross member extending between the arms and adjustably positionable at any desired height thereon. The support members are connected by stringers. Each stringer extends between the corresponding arms of a pair of supports with its opposite ends supported at heights determined by the cross member on each support. The hose lies on and is supported by the stringers in the spans between the supports. Each stringer is pivotally connected to the two supports so that the trestle can extend along above the ground in a nonlinear path as desired.

Patented March 30, 1971
3,572,622
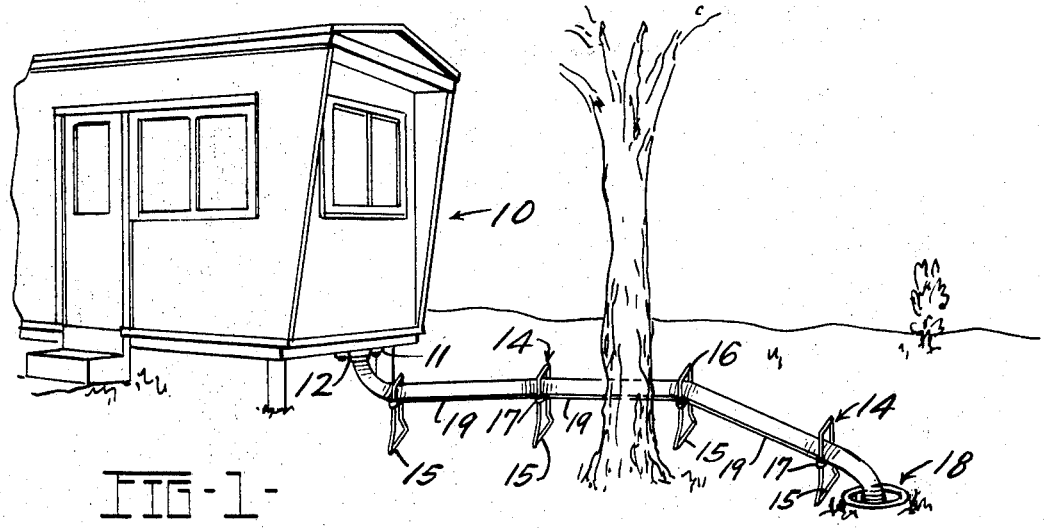
FIG-1-
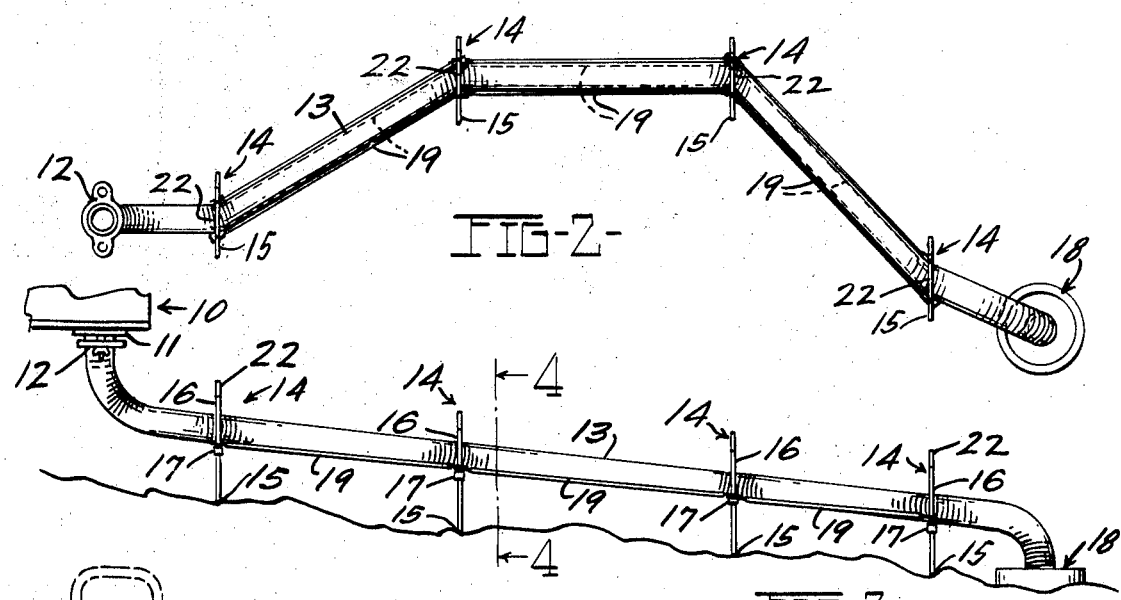
FIG-2-
FIG-3-
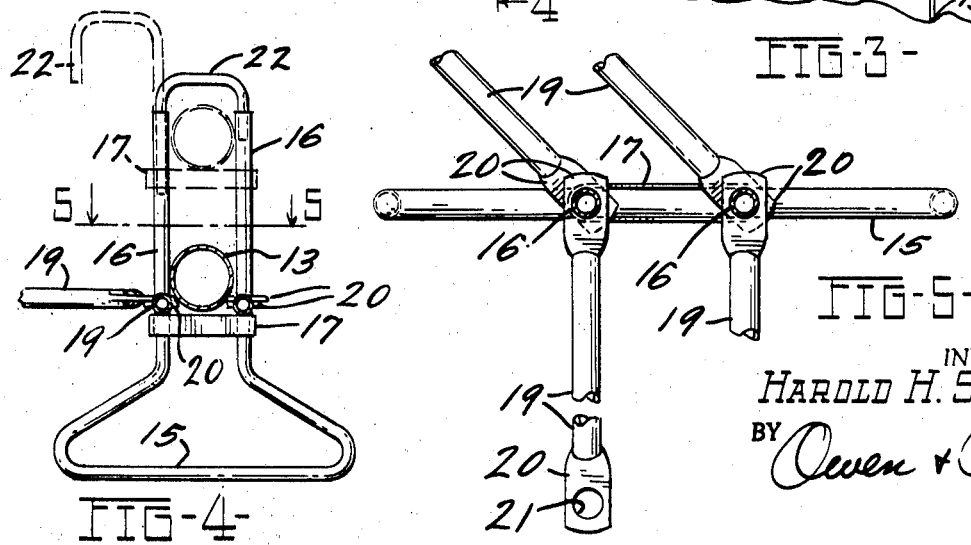
FIG-4-
FIG-5-
INVENTOR:
HAROLD H. SMITH.
BY Owen + Owen
ATT'YS.

TRESTLE FOR FLEXIBLE HOSE

BACKGROUND OF THE INVENTION

House trailers, campers and other vehicles in which persons live usually are equipped with toilets, showers, sinks and the like from which waste materials are discharged. Some of these vehicles are provided with waste storage tanks, but, for the most part, it is contemplated that the waste lines of vehicles of this type will be connected by one form of hose or another and to a sewage head at a camping or trailer park.

Because the ground at such establishments often is not level and because there may be obstructions such as stones, boulders, trees or other items above ground in position between the trailer or camper and the sewer head, it is difficult to connect any type of waste hose from the trailer or camper directly to the sewer head. The use of flexible hoses has been suggested in the past but a flexible hose creates a problem in that it will not stand by itself to provide a "fall" across the distance from the trailer or camper to the sewage head. If laid upon the ground, the irregularities of the surface may prevent the ready flow of sewage through the waste hose.

Support trestles of one kind and another have been suggested in the past but most of them are either too cumbersome, too expensive to manufacture, or too difficult to erect and disassemble.

It is therefore the principal object of the instant invention to provide a simple trestle for a flexible hose such as a waste hose for a house trailer or camper which trestle is readily assembled from a plurality of similar support and stringer units, may be erected in nonlinear extent and has simple means for positioning the height of the hose at each support member and in the spans therebetween to insure a steady "fall" from the trailer or camper to a sewage head.

BRIEF DESCRIPTION OF THE DRAWINGS

FIG. 1 is a fragmentary view in perspective showing a portion of a house or trailer equipped with a hose trestle embodying the invention;

FIG. 2 is a fragmentary plan view of a flexible hose supported on a trestle embodying the invention;

FIG. 3 is a fragmentary view in elevation of the hose shown in FIG. 2;

FIG. 4 is a fragmentary vertical sectional view taken from the position indicated by the line 4—4 and showing one of the support members in elevation and with parts being shown in broken line and being illustrated on an enlarged scale; and FIG. 5 is a fragmentary horizontal sectional view taken along the line 5—5 of FIG. 4 and shown on a still further enlarged scale with some of the parts being broken away and some parts being shown in alternative positions.

DESCRIPTION OF A PREFERRED EMBODIMENT

A house trailer or camper 10 has a waste connection 11 for the discharge of waste and sewage from sanitary facilities in trailer 10. Such a waste connection 11 usually is provided with a detachable coupling 12 and the coupling 12 can receive and tightly bind the end of a waste hose 13. In the illustrated embodiment of the invention, the waste hose 13 is shown as a flexible hose but the trestle of the invention also has utility for supporting a sectional hose with flexible couplings or any similar hose or pipe.

A trestle embodying the invention for the support of the hose 13 comprises a plurality of support units 14 of which four are shown as supporting the hose 13 in FIGS. 1—3 inclusive. Each of the support units 14 has a ground engaging base 15 and a pair of spaced vertical arms 16 which extend upwardly from the base 15, preferably in spaced parallel relationship. In the particular embodiment illustrated in the drawings, each of the support units 14 comprising the base 15 and the two arms 16, is indicated as being formed from a single length of elongated material, in this case relatively resilient tubing, bent to provide the substantially flat, wide base 15 and then inwardly to provide the closer spaced vertical arms 16. The spacing between the arms 16 is so selected as to be slightly less than the maximum outside diameter of the waste hose 13 so that the hose 13 can be inserted downwardly between the arms 16 and will be slightly pinched therebetween when the assembly has been completed.

Each of the supports units 14 also has a cross member 17 which embraces the two arms 16 and frictionally engages their surfaces so that the cross member 17 can be positioned at a lower level, as indicated in solid lines in FIG. 4, or at a higher level, as indicated in broken lines in FIG. 4, as is necessary to insure the proper "fall" of the waste hose 13 across the distance from the waste connection 11 of the trailer 10 to a sewer head generally indicated by the reference number 18.

The supports units 14 are connected to each other to make a self-supporting trestle by longitudinal stringers 19, each of the stringers 19 extending between and being connected to the corresponding arms of two of the support units 14. In the embodiment of the invention shown in the drawings, each of the stringers 19 is illustrated as being a single length of rod or tubing having flattened ends 20 and each of the ends 20 has an aperture 21 of such size as to slip over the end of one of the arms 16 thereby to be pivotally connected to the support unit 14.

As can best be seen by reference to FIGS. 4 and 5, the cross member 17 is of such length as to embrace the two vertical arms 16 and to squeeze them inwardly slightly thereby firmly to grip the hose 13. Because of the frictional engagement between the crossmembers 17 and the arms 16, they may be readily moved between the positions indicated in FIG. 4 and, in either position, function also to support the ends of the stringers 19 which are engaged with the legs 16 of the respective support unit 14.

Reference to FIGS. 1—3 inclusive illustrate how the flexibility of the trestle provided by the pivotal engagement of the stringers 19 with the support units 14 and the selectively vertically movable crossmember 17 permit a user to extend the waste hose 13 in a nonlinear fashion to avoid an obstruction such as the tree shown in FIG. 1 and also into for the vertical adjustment of the height of the stringers 19 and the hose 13 at the several support members 14 in order to insure a steady "fall" from the trailer 10 to the sewer head 18 regardless of the particular surface contour of the ground.

If desired, the upper ends of the legs 16 may be coupled to each other after insertion of the hose 13 by inverted U-shaped clips 22. When the support members 14 are fabricated from a single length of bent tubing as illustrated in the drawings, each clip 22 is simply a short length of rod of such outside diameter as to slide into the open ends of the arms 16 to prevent them being inadvertently separated from each other and to prevent the hose 13 from being inadvertently kicked up out of the embracing position between the arms 16.

I claim:

1. A trestle for a flexible hose, said trestle comprising (1) a plurality of support units, each of said support units having a ground contacting base, a pair of laterally spaced vertical arms, said arms being spaced from each other a distance such that said hose may be embraced therebetween, and a crossmember extending between said arms and adjustably positionable thereon at selected heights above said base and (2) a plurality of stringers extending between said supports, each of said stringers being removably and pivotally engaged with the corresponding arms of two of said supports and the same ends of all of said stringers engaging each of said supports being supported at the height determined by that one of said crossmembers on said support.

2. A trestle according to claim 1 in which each of said supports consists of a single length of elongated material bent to form a flat base portion and two upwardly extending arms in generally U-shaped configuration.

3. A trestle according to claim 1 in which the crossmember is a band of such length as to embrace the arms of the support and urge them against the exterior of the hose.

4. A trestle according to claim 1 in which each of the stringers has an aperture at each of its ends which slips over one of the arms of the connected one of said supports.

5. A trestle according to claim 2 in which the material of the support is resilient and the crossmember is an elastic band adapted to be stretched around and to embrace both arms of said support and to extend across therebetween.

6. A trestle according to claim 2 and a clip engageable with the upper ends of said arms for holding them in embracing relationship to the hose.

UNITED STATES PATENT OFFICE
CERTIFICATE OF CORRECTION

Patent No. 3,572,622          Dated     March 30, 1971

Inventor(s)        Harold H. Smith

It is certified that error appears in the above-identified patent and that said Letters Patent are hereby corrected as shown below:

Column 2, line 40, after "also" insert -- provide --.

Signed and sealed this 29th day of June 1971.

(SEAL)
Attest:

EDWARD M. FLETCHER, JR.                    WILLIAM E. SCHUYLER, JR.
Attesting Officer                          Commissioner of Patents

FORM PO-1050 (10-69)